United States Patent [19]

Keuchel

[11] 3,950,582

[45] Apr. 13, 1976

[54] FIBRILLATED TEXTILE STRUCTURE AND PROCESS OF PRODUCING SAME

[75] Inventor: Herbert W. Keuchel, Tallmadge, Ohio

[73] Assignee: PNC Company, Wycoff, N.J.

[22] Filed: Aug. 23, 1973

[21] Appl. No.: 391,029

Related U.S. Application Data

[63] Continuation-in-part of Ser. No. 169,183, Aug. 5, 1971, abandoned.

[52] U.S. Cl. .................... 428/85; 156/72; 156/435; 428/92; 428/95; 428/174
[51] Int. Cl.² D03D 27/00; D04H 11/00; D05C 17/00
[58] Field of Search .............................. 161/62–67, 161/133, 117, 132, 402; 156/72, 206, 207, 254, 435, 250, 257, 268, 280, 474; 264/145, 147, 162, 243, DIG. 47; 428/85, 92, 95, 174

[56] References Cited

UNITED STATES PATENTS

| 3,010,508 | 11/1961 | Wilson | 156/254 |
| 3,127,293 | 3/1964 | Trenteseaux | 156/72 |
| 3,431,875 | 3/1969 | Boultinghouse | 161/65 |

*Primary Examiner*—Marion E. McCamish
*Attorney, Agent, or Firm*—John E. Benoit

[57] ABSTRACT

An oriented thermoplastic sheet is pleated and an adhesive and backing is applied to one face thereof. The other face is then pleat fibrillated to a desired depth. Both faces may have adhesive and backing applied thereto with the structure being centrally cut parallel to the faces. The extending edges of the sheets on the two structures are then fibrillated to a desired depth.

6 Claims, 6 Drawing Figures

FIBRILLATED TEXTILE STRUCTURE AND PROCESS OF PRODUCING SAME

This application is a continuation-in-part U.S. Pat. Application Ser. No. 169,183, filed Aug. 5, 1971, now abandoned.

This invention relates broadly to fibrillated nonwoven textile structures and the method and apparatus for treating selective portions of that component of a pleated oriented thermoplastic sheet which is subject to fibrillation for producing said structures, and more particularly to such structures which are selectively fibrillated.

It is well-known that many synthetic organic linear polymers possess a very marked fissility when they have been uniaxially oriented to a high degree. Several treatment methods make use of this property in the manufacture of threads and textile fibers which are formed by splitting highly oriented thermoplastic materials which are usually foil or sheet construction. This type of disintegration is generally referred to as fibrillation and may be carried out so as to form single but generally interconnected threads or fibers by means such as brushing, rolling, slitting, rubbing, twisting, grating, impacting, striking or using other sources of kinetic energy on the oriented sheet material.

After fibrillation, the fibrous product is treated like a conventional yarn by methods such as twisting, plying and crimping. This yarn is then used in a conventional fashion to make such textiles as pile structures for carpets as well as other fabrics fro various textile uses.

Such material formed from plastic films is fibrillated in a continuous fashion by one or more of the well-known means before it is used for the making of such finished products as the above mentioned structures.

It has been also proposed to produce pile structures with non-fibrillated ribbons and subsequently fibrillate a portion of the structure so created. This technique is described in U.S. Pat. No. 3,431,875 and also in U.S. Pat. No. 3,542,632.

It is an object of this invention to produce a nonwoven textile structure comprised of a pleated thermoplastic sheet and subsequently to achieve the desirable properties in the sheet by selectively fibrillating certain portions thereof without affecting the remaining portion of the structure.

A further object of the invention is to treat a selective portion of that component of a pleated sheet which is subject to fibrillation.

A further object of the invention is to treat a pleated thermoplastic sheet by a fibrillation process which results in selective treatment of a portion of the pleated sheet.

This selective fibrillation will hereinafter be termed "pleat fibrillation." The term "pleat fibrillation" is intended to cover the fibrillation of the folds of one side of the pleated structure while the folds on the other side of the pleated structure remain substantially non-fibrillated. Additionally, the term covers selective fibrillation of pleated material after it has been centrally cut so as to create an open structure. Effectively, it relates to a treatment of selected portions of a pleated oriented sheet and results in fibrillation of that part of the sheet which comprises said selected portions. Since the ultimate selective fibrillation will be performed on that portion of the pleated sheet which constitutes one face of the pleated structure, the appropriate term of "pleat fibrillation" has been selected.

The term "sheet" as used herein is defined as one of substantial width, i.e., at least twelve inches across its narrow dimension. During the treatment of the sheet, there is no substantial reduction of the width thereof. This is in marked contrast to the techniques described in the above-identified patents.

When the material is to be used for tufting in the above-identified patents, and particularly U.S. Pat. No. 3,431,875, a sheet of material of a width of up to approximately 3 to 10 inches is crimped and/or twisted and forced through an eyelet to form a round strand configuration which is less than one inch thick. The maximum thickness for the largest denier of tufted commercial yarn is about 5200 denier which equates to a one mil thick strand approximately ⅛ inch to 1 inch wide. Such a process of reduction of the sheet is clearly set forth in U.S. Pat. No. 3,431,875 cited above. As stated therein, the diameter of the eyelet employed for compressing the film will be 1 to ⅛ inch of less. In effect, the ultimate fibrillation of the process is performed on a compressed strand of material and not on a sheet as defined herein.

Although it is preferable to use polypropylene sheets for the pleat fibrillation of the present invention, the invention is not limited to these substances. Essentially, the invention is applicable to an oriented thermoplastic sheet with splitting tendencies since such sheets will pleat fibrillate. Sheets produced from other polymers or mixtures thereof will also pleat fibrillate. Of particular commercial importance are: Polyethylene terephthalate; polypropylene and polypropylene copolymers; polyethylene and polyethylene copolymers; nylon 6, nylon 6,6; vinyl polymers and copolymers including polyvinylidene chloride, styrene polymers and copolymers, acrylic polymers and copolymers; cellulose acetate; cellulose propionate; cellulose acetate butyrate. Additionally, multiphase systems, that is polymer mixtures, in various forms will produce products which are susceptible to pleat fibrillation. Also of interest are foamed and subsequently oriented sheets and sheets containing additives which act as split initiators, and/or fillers, such as small particulate matter.

Since the present invention is particularly suited for the production of carpets, the subsequent description will be directed thereto although it is not to be considered as limitive of the present invention.

Accordingly, it is an object of this invention to provide a method and resultant product relating to pleated material which is subsequently selectively fibrillated.

Further objects of the invention will become apparent from the following description when taken in conjunction with the drawings wherein FIG. 1 is a flow diagram of the process for producing the pleat fibrillated product of the present invention;

The general technology for preparing the polymer sheet used in the present invention is well-known in the art. The polymers are extruded in a conventional extruder to provide a sheet of desired thickness and width. For purposes of economics, a very wide sheet may be extruded so as to produce a wide finished product.

The sheet may be oriented in one or more of several different known manners. Two different processes are now in common use for the uniaxial stretching or orientation of the sheet. One such process uses hot ovens and the other uses heated rolls or plates. These processes have been used for many years. These and other processes may be used, since the specific orientation of the sheet is not considered part of the present invention. The term "orientation" as used in the present invention refers to any significant orientation of the sheet.

Basically, the present invention includes the apparatus and method for producing a pile structure from a substantially non-fibrillated, non-slit, pleated oriented thermoplastic sheet. The properties of the pile structure are improved by selectively fibrillating a portion of the pleated structure while the remaining portion is left intact and substantially non-fibrillated.

Figure 1:
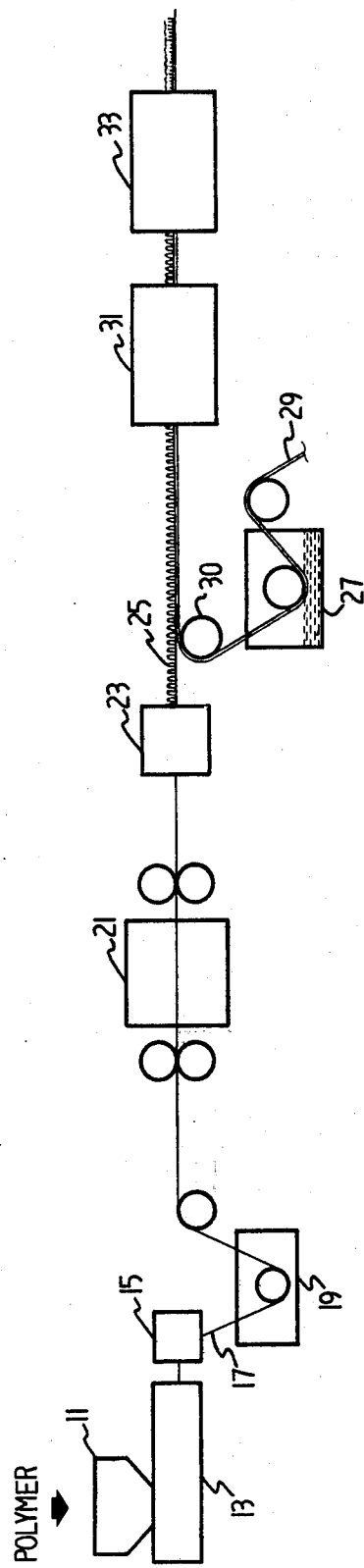

The non-woven textile structure as described may be produced by the use of apparatus as shown in the flow diagram of FIG. 1.

A hopper 11 containing a polymer of any suitable form is fed into a heated extruder 13 having means such as a screw (not shown) for melting, shearing and delivering the hot polymer to a slot die 15. Sheet 17 is extruded from die 15 and passed into and through a quenching zone such as water bath 19 to solidify the molten extrudate.

At this point during the standard operation the sheet then passes through a slitting device so as to produce a plurality of ribbons. It is then oriented and may be crimped and/or twisted so as to produce a narrow strand.

However, in the present invention, the sheet remains intact and is oriented in the device 21 by any of the well-known means such as discussed hereinabove.

The oriented sheet is then passed through a folding or pleating device 23, to be discussed hereinafter, so as to produce the pleated sheet 25. An adhesive may then be applied to one side of the pleated structure. One such means as shwon in FIG. 1 consists of passing a backing fabric 29 through an adhesive bath 27. The backing fabric passes about roller 30 and adheres to one side of pleated sheet 25. Such bonding may also be used to control pleat density. Although not required, backing fabric 29, when secured to the adhesive side of the sheet, increases the dimensional stability of the structure.

After the structure has passed through dryer 31, it is then passed through fibrillator 33. Fibrillation of the exposed pleats may be performed by any of several known methods such as vibration through fluid action, impact treatments, shearing, piercing and split propogation to facilitate splitting, or with combination treatments such as brushing, carding and napping.

Figure 2:
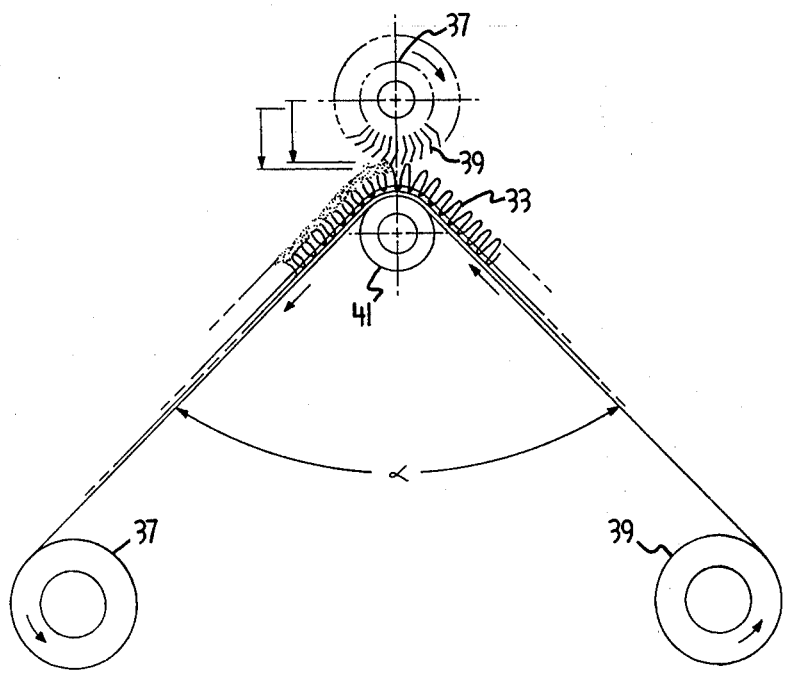
FIG. 2 is an elevational view of one basic fibrillation mechanical device for providing pleat fibrillation of the ribbon material.

Turning to FIG. 2, there is shown a preferred embodiment of the method of pleat fibrillation as set forth in the present invention. The pleated structure 33 containing the pleated sheet is passed under a cylinder 37 having a multiplicity of sharp or pointed knife or wire-like elements 39 which are adapted to enter into and cut or sever a portion of one face of the pleated structure.

The storage roll 37 may be driven at any desirable rate by motor means (not shown) so as to draw the pile structure 33 from feed roll 39 over idler roll 41. Additionally, as indicated by the arrows and associated lines, cylinder 37 may be adjusted by means not shown so as to obtain a particular desired depth of penetration of the tufts. Such control of depth is important so as to be able to vary the texture as desired for particular applications. Also, it is important not to fibrillate the portion of the structure imbedded in the adhesive. When that portion is not fibrillated, it will be bonded securely and will strongly resist being pulled out of the structure.

Figure 3:
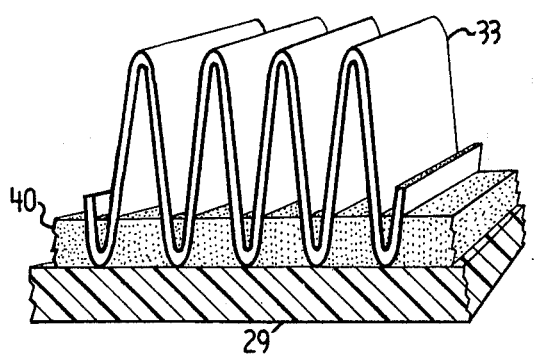
FIG. 3 is a perspective view of a non-fibrillated pleated sheet coated with an adhesive on one face and bonded to a backing.
Figure 4:
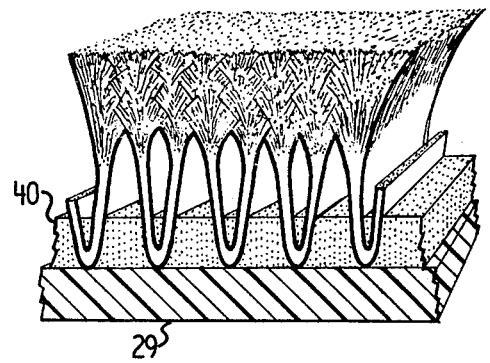
FIG. 4 is a perspective view of the structure of FIG. 3 after pleat fibrillation.

FIG. 3 illustrates the pleated structure 33 as it appears secured to backing 29 by means of adhesive 40 before fibrillation. FIG. 4 illustrates the same structure after it has passed through the fibrillation process of FIG. 2.

Figure 5:
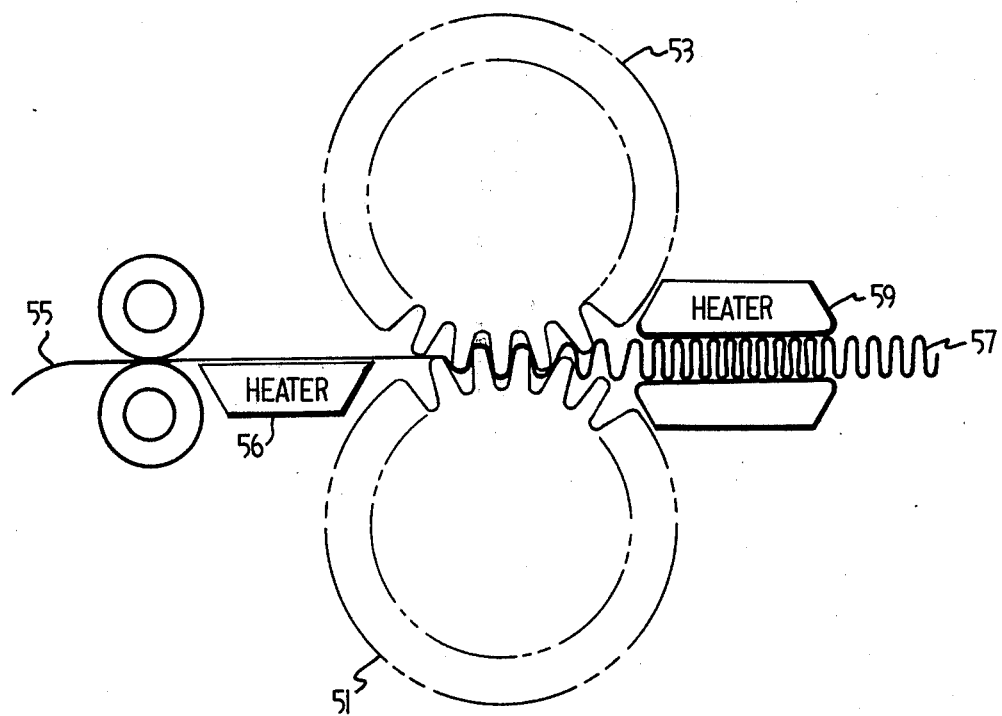
FIG. 5 is a schematic showing of one means for pleating the thermoplastic sheet.

FIG. 5 is a schematic representation of one means for obtaining a pleated structure from the oriented sheet material. There is shown a first gear 51 having teeth which mate with a second gear 53. In the particular illustration, the material first passes over a preheat shoe 56 which may be heated by live steam, electricity, etc. (not shown). As the non-fibrillated thermoplastic material 55 is passed between the two gears, it is folded so as to emerge from heating chamber 59 as a pleated nonfibrillated sheet 57. After the sheet 55 is pleated by gears 51 and 53, it passes through heater 59. The deformation process itself provide sufficient pressure to impart a memory in a thermoplastic material. However, the heat supplied by heater 59 increases the memory of the sheet thus effectively creating a permanent pleat therein. Also, as is well known, the addition of chemicals to plasticize or interact chemically will also increase the memory of the pleated sheet.

EXAMPLE I

Polypropylene, melt index of 6 is extruded into a 6 mil thick sheet and stretched so as to produce an oriented sheet 1 mil thick and 12 inches wide.

The sheet is subsequently passed through a pair of gears so as to fold the sheet across the direction of machine movement.

The resulting pleats in the sheet are compressed to a density of 20 fold/in. One face of the pleated structure is coated with adhesive and bonded to a backing fabric.

The pleated structure is then pleat fibrillated as indicated in FIG. 2 under the following conditions.

| | |
|---|---|
| Cylinder r.p.m. | 500; 250; 50 |
| Cylinder diameter, inches | 6 |
| Fibrillation angle equivalent to a radius of | 0.5; 3.0 inches |
| Fabric Speed m/min | 5.0 |
| Fibrillation Surface | Fancy Card Cloth |

The resultant product has a highly fibrillated pile surface. Penetration of fibrillation is set at 60% of fibrillated heights as measured from the fibrillatted apex.

EXAMPLE II

The film as described in Example I is converted into a pleated structure. The back side of the structure is coated with latex to secure the pleats on a backing fabric. A card wire covered cylinder is used fro fibrillation. The card wire is stiff, sharp-edged and pointed.

During fibrillation, the pleats are ripped open at a high r.p.m. so as to produce a cut pile fabric. The pile is then sheared to produce an even pile height.

EXAMPLE III

The conditions of Example II exist except that the cylinder is covered with pointed napper clothing. The bonded, pleated fabric is fed under the napper roll at a fibrillation angle equivalent to a radius of 0.5 inches and at a speed slightly lower than the surface speed of the cylinder. This results in a wire penetration and raising effect, but not a pull-through and tearing as results in Example II. Penetration and movement of the wires through the sheet produces film splitting. Such predetermined synchronization of the fabric speed and cylinder r.p.m. prevents loop tearing if so desired.

Figure 6:
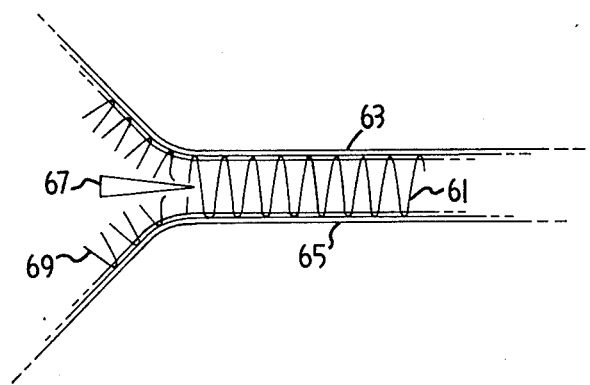
FIG. 6 shows a modified structure of the present invention.

FIG. 6 illustrates a modified process for use with pleated sheet material. In this process, pleated sheet 61 has backing 63 and 65 secured to both faces thereof. This structure is then centrally cut by means such as knife 67 so as to produce two structures. Each of these structures will have individual sheets 69 terminating in two edges instead of a loop. The resulting structure may then be fibrillated as previously discussed.

The present invention produces a textile structure wherein the ratio of the width of the initial sheet to the width of the final fibrillated pleated material is substantially constant so as to form a planar configuration as opposed to a linear configuration which is formed by a loop in the tufting process.

As will now be obvious, the present invention greatly reduces the cost of producing a textile structure of thermoplastic materials. The standard steps of slitting the material and subsequently tufting the ribbons has been eliminated. The only additional step necessary is the pleating of the material which may be easily and economically accomplished.

The above description and drawings are illustrative only since individual equivalent components may be substituted without departing from the concept of the present invention as set forth in the following claims.

What is claimed is:

1. A textile structure comprising
   a substantially permanently pleated oriented thermoplastic structure having substantial width;
   an adhesive and backing on one face of said pleated sheets;
   the other face of said pleated sheet being fibrillated to a predetermined depth within said pleats.

2. A method of producing a textile structure which comprises
   pleating an oriented thermoplastic sheet having substantial width;
   applying an adhesive and a backing to one face of said pleated sheet; and
   pleat fibrillating the other face of said pleated sheet of said substantial width.

3. The method of claim 2 wherein said sheet has a width of at least twelve inches.

4. The method of claim 2 further comprising adjusting the depth of said pleat fibrillation.

5. A method of producing a textile structure which comprises
   heating a polymer;
   extruding said polymer into a sheet having substantial width;
   solidifying the extruded sheet;
   forming said sheet into a substantially permanent pleated structure;
   applying an adhesive and a backing to one face of said pleated sheet; and
   pleat fibrillating the other face of said pleated sheet having a substantial width.

6. A method of producing a textile structure which comprises
   substantially permanently pleating an oriented thermoplastic sheet having substantial width;
   applying an adhesive to both faces of said pleated sheet;
   applying a backing to the adhesive on both of said faces;
   cutting said sheet parallel to and between said backings; and
   fibrillating each of the resultant free ends of said sheet having substantial width extending from said adhesive.

* * * * *